(12) United States Patent
Park et al.

(10) Patent No.: US 9,390,646 B2
(45) Date of Patent: Jul. 12, 2016

(54) COLOR CALIBRATION APPARATUS AND METHOD USABLE WITH DISPLAY DEVICE

(71) Applicant: SAMSUNG ELECTRONICS CO., LTD., Suwon-si (KR)

(72) Inventors: Ji-yong Park, Suwon-si (KR); Nam-kyun Beon, Seoul (KR); Sang-kyun Im, Seoul (KR); Young-hoon Cho, Suwon-si (KR); Hye-rin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 36 days.

(21) Appl. No.: 14/089,201

(22) Filed: Nov. 25, 2013

(65) Prior Publication Data

US 2014/0152706 A1 Jun. 5, 2014

(30) Foreign Application Priority Data

Nov. 30, 2012 (KR) .......................... 10-2012-0138217

(51) Int. Cl.
  *G09G 3/20* (2006.01)
  *H04N 1/60* (2006.01)

(52) U.S. Cl.
  CPC ........... *G09G 3/2003* (2013.01); *H04N 1/6052* (2013.01); *H04N 1/6088* (2013.01)

(58) Field of Classification Search
  CPC ........... G09G 3/04–3/19; H04N 13/02; H04N 13/0425; H04N 13/0257
  See application file for complete search history.

(56) References Cited

U.S. PATENT DOCUMENTS

| | | | |
|---|---|---|---|
| 2003/0234864 A1* | 12/2003 | Matherson et al. | 348/175 |
| 2006/0280360 A1* | 12/2006 | Holub | 382/162 |
| 2011/0234612 A1* | 9/2011 | Wei et al. | 345/589 |
| 2012/0075435 A1* | 3/2012 | Hovanky et al. | 348/51 |
| 2013/0303869 A1* | 11/2013 | Rebec et al. | 600/365 |

* cited by examiner

*Primary Examiner* — Olga Merkoulova
(74) *Attorney, Agent, or Firm* — Sughrue Mion, PLLC

(57) ABSTRACT

A color calibration apparatus includes an image obtaining unit configured to obtain first and second photographed images which are generated by photographing first and second mono-color test images displayed on the display device; a controller configured to detect an ambient light area on which an ambient light is shining within the first photographed image based on pixel values of the first photographed image, and further configured to determine a remaining area of the first photographed image other than the ambient light area as a representative value calculating area; and an image processor configured to calculate a representative value based on pixel values of an area corresponding to the representative value calculating area within the second photographed image, and further configured to perform color calibration of the display device based on the representative value.

20 Claims, 13 Drawing Sheets

(a) FIRST PHOTOGRAPHED IMAGE  (b) FOURTH DISPLAY DEVICE (c) SECOND PHOTOGRAPHED IMAGE (d) SECOND PHOTOGRAPHED IMAGE CALIBRATED AS REPRESENTATIVE VALUE (e) RESULTING IMAGE OF COLOR CALIBRATION (a)

(b)

(c)

(d)

(a)

(b)

STANDARD DISPLAY DEVICE SETTING

REFERENCE SETTING

COLOR TEMPERATURE SETTING

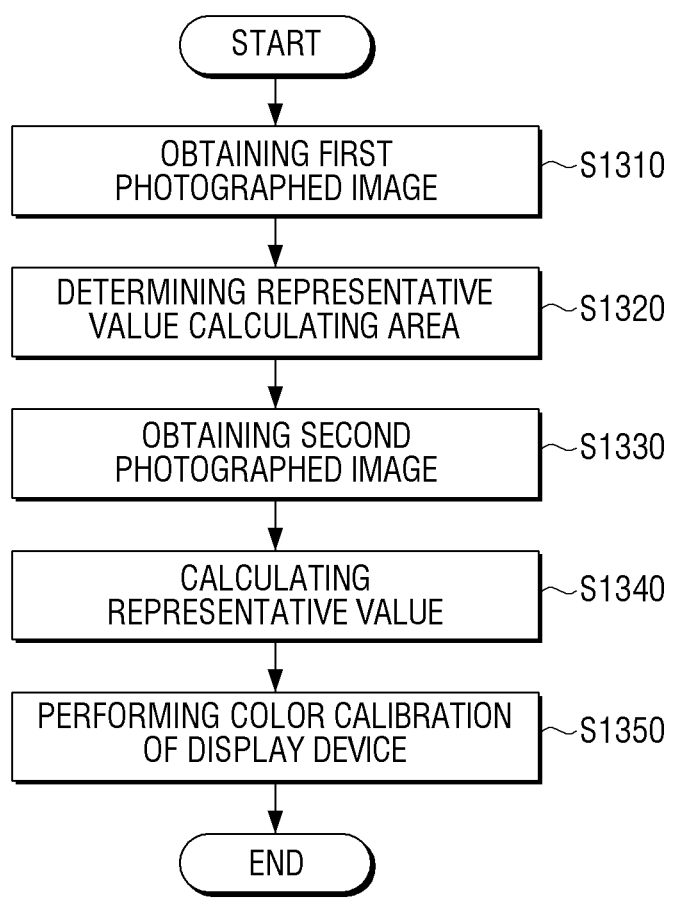

COLOR CALIBRATION APPARATUS AND METHOD USABLE WITH DISPLAY DEVICE

CROSS-REFERENCE TO RELATED APPLICATION

This application claims the benefit under 35 U.S.C. §119 (a) from Korean Patent Application No. 10-2012-0138217 filed Nov. 30, 2012 in the Korean Intellectual Property Office, the disclosure of which is incorporated herein by reference in its entirety.

BACKGROUND

1. Field

The present disclosure relates to a color calibration apparatus and method usable with a display device. More particularly, the present disclosure relates to a color calibration apparatus and method which can perform color calibration of a display device by using an image obtained by photographing an image being displayed on the display device.

2. Description of the Related Art

There are various sizes of display devices ranging from small size display devices that may be used in mobile devices to large screen display devices that may be used in public displays, e.g., advertising, according to an intended purpose.

Existing outdoor advertising is limited to provide flat and fragmentary content such as attaching photos on a large signboard, using light emitting diodes (LEDs), etc. However, thanks to the recent development of electronic technology, a large screen display device can be implemented by using liquid crystal displays (LCDs) or plasma display panels (PDPs), and thus, rich and diverse types of content and dynamic video can be provided through the large screen display device.

Accordingly, for advertising and promotion purposes, companies and public institutions have installed and managed the large screen display devices both indoors and outdoors. The large screen display device is typically used as a single unit. Alternatively, in order to increase advertising effectiveness or to form a larger screen, a video wall consisting of a plurality of display devices is used.

In a case of a large screen display apparatus consisting of a number of display devices, a problem may occur in which an image output from the large screen display apparatus appears unnatural due to color differences which occur between the display devices. In order to solve the problem that such non-uniform images are outputted, color calibration of the display devices is needed.

A known color calibration method of a video wall involves a user climbing a ladder with a color calibration apparatus and calibrating color between the display devices, which takes a long time and is constrained in terms of space.

Also, other color calibration methods using a camera have been introduced, but have a problem in that that the color calibration is inaccurate since the color calibration is performed without consideration of ambient light and sunlight.

Accordingly, the need to solve these problems has arisen.

SUMMARY

The present disclosure has been developed in order to overcome the above drawbacks and other problems associated with the conventional technique. An aspect of the exemplary embodiments disclosed in the present disclosure is to provide a color calibration apparatus and method that performs color calibration in consideration of an effect of ambient light when the color calibration of a display device is performed by using a photographed image that is generated by photographing the display device.

The above aspect and/or other features of the exemplary embodiments can substantially be achieved by providing a color calibration apparatus, which includes an image obtaining unit configured to obtain first and second photographed images which are generated by photographing first and second mono-color test images displayed on the display device; a controller configured to detect an ambient light area on which an ambient light is shining within the first photographed image based on pixel values of the first photographed image, and further configured to determine a remaining area of the first photographed image other than the ambient light area as a representative value calculating area; and an image processor configured to calculate a representative value based on pixel values of an area corresponding to the representative value calculating area within the second photographed image, and further configured to perform color calibration of the display device based on the representative value.

The image processor may be configured to calculate one of an average value and a median value of the pixel values of the area corresponding to the representative value calculating area within the second photographed image as the representative value.

The color calibration apparatus may include an image generator configured to generate a plurality of first mono-color test images; and a communication unit configured to transmit the plurality of first mono-color test images to the display device, wherein the image obtaining unit may be configured to obtain a plurality of first photographed images corresponding to the plurality of first mono-color test images, and, in response to determining that one of the first photographed images is a first photographed image within which the ambient light area is not detected among the plurality of first photographed images, the controller determines an entire area of the first photographed image within which the ambient light area is not detected as the representative value calculating area.

The color calibration apparatus may include a user interface (UI) generator configured to generate a mode selection UI which enables a user to select one of an automatic ambient light calibration mode automatically and a manual ambient light calibration mode; and a display unit configured to display the mode selection UI, wherein, if the an automatic ambient light calibration mode is selected in the mode selection UI, the controller detects the ambient light area on which the ambient light is shining within the first photographed image based on the pixel values of the first photographed image, and determines the remaining area of the first photographed image other than the ambient light area as the representative value calculating area, and if the manual ambient light calibration mode is selected in the mode selection UI, the controller controls the display unit to display the first photographed image and a UI which enables the user to specify an area within the first photographed image, and, when the area is specified in the UI, the controller determines the specified area as the representative value calculating area.

The color calibration apparatus may include a display unit configured to display a warning if an effect of the ambient light exceeds a predetermined level.

The color calibration apparatus may include a UI generator configured to generate a UI to set a target value for the color calibration, and a display unit configured to display the UI; wherein the image processor performs the color calibration of the display device based on the target value set through the UI and the representative value.

The controller may provide the second mono-color test image to the display device to display the second mono-color test image, and, the image processor may compare the representative value and the target value, and, if a difference between the representative value and the target value is greater than a predetermined threshold value, the image processing unit may adjust R, G, and B gains of the display device, and may repeatedly perform the color calibration.

The UI may include at least one of an automatic setting menu to automatically set the target value, a standard display device setting menu to select a standard image to set the target value among a plurality of the second photographed images of the display device, a reference setting menu to set a pixel value of a stored reference image as the target value, a color temperature setting menu to set the target value through color temperature adjustment, and a manual setting menu to set the target value through adjustment of R, G, and B values.

According to another aspect of the exemplary embodiments, a color calibration method of a color calibration apparatus may include obtaining a first photographed image which is generated by photographing a first mono-color test image displayed on a display device; detecting an ambient light area on which an ambient light is shining within the first photographed image based on pixel values of the first photographed image, and determining a remaining area of the first photographed image other than the ambient light area as a representative value calculating area; obtaining a second photographed image which is generated by photographing a second mono-color test image displayed on the display device; calculating a representative value based on pixel values of an area corresponding to the representative value calculating area within the second photographed image; and performing color calibration of the display device based on the representative value.

The calculating of the representative value may include calculating one of an average value and a median value of the pixel values of the area corresponding to the representative value calculating area within the second photographed image as the representative value.

The color calibration method may include generating a plurality of first mono-color test images; and transmitting the plurality of first mono-color test images to the display device, wherein the obtaining of the first photographed image comprises obtaining a plurality of first photographed images corresponding to the plurality of first mono-color test images, and the determining of the representative value calculating area includes determining, in response to determining that one of the first photographed images is a first photographed image within which the ambient light area is not detected among the plurality of first photographed images, an entire area of the first photographed image within which the ambient light area is not detected as the representative value calculating area.

The color calibration method may include generating a mode selection user interface (UI) which enables a user to select one of an automatic ambient light calibration mode and a manual ambient light calibration mode; and displaying the mode selection UI, wherein, if the automatic ambient light calibration mode is selected in the mode selection UI, the determining of the representative value calculating area includes detecting the ambient light area on which the ambient light is shining within the first photographed image based on the pixel values of the first photographed image, and determining the remaining area of the first photographed image other than the ambient light area as the representative value calculating area, and if the manual ambient light calibration mode is selected in the mode selection UI, the color calibration method further comprises displaying the first photographed image and a UI to specify an area within the first photographed image, and, when the area is specified using the UI, the determining of the representative value calculating area includes determining the area as the representative value calculating area.

The color calibration method may include displaying a warning if an effect of the ambient light exceeds a predetermined level.

The color calibration method may include generating a UI to set a target value for the color calibration; and displaying the UI, wherein the performing of the color calibration includes performing the color calibration of the display device by using the target value set through the UI and the representative value.

The performing of the color calibration may include comparing the representative value and the target value, and adjusting, if a difference between the representative value and the target value is greater than a predetermined threshold value, R, G, and B gains of the display device, and repeatedly performing the obtaining of the second photographed image, the calculating of the representative value, and the performing of the color calibration.

The UI may include at least one of an automatic setting menu to automatically set the target value, a standard display device setting menu to select a standard image to set the target value among a plurality of the second photographed images of the display device, a reference setting menu to set a pixel value of a stored reference image as the target value, a color temperature setting menu to set the target value through color temperature adjustment, and a manual setting menu to set the target value through adjusting R, G, and B values.

According to another aspect of the exemplary embodiments, a non-transitory computer-readable medium may include a program stored therein which, when executed, causes a computer to perform a color calibration method which may include obtaining a first photographed image which is generated by photographing a first mono-color test image displayed on a display device; detecting an ambient light area on which an ambient light is shining within the first photographed image based on pixel values of the first photographed image, and determining a remaining area of the first photographed image other than the ambient light area as a representative value calculating area; obtaining a second photographed image which is generated by photographing a second mono-color test image displayed on the display device; calculating a representative value based on pixel values of an area corresponding to the representative value calculating area within the second photographed image; and performing color calibration of the display device based on the representative value.

According to various exemplary embodiments of the present disclosure, when color calibration of a display device is performed by using a photographed image that is generated by photographing the display device, the color calibration is performed in consideration of an effect of ambient light so that accuracy of the calibration is increased. Also, since the photographed image is used, the color calibration of multiple display devices can be performed at the same time. Therefore, the time required to perform the color calibration may be shortened, and limitations of space are reduced.

Other objects, advantages and salient features of the present disclosure will become apparent from the following detailed description, which, taken in conjunction with the annexed drawings, discloses exemplary embodiments.

BRIEF DESCRIPTION OF THE DRAWINGS

These and/or other aspects and advantages of the present disclosure will become apparent and more readily appreciated from the following description of the exemplary embodiments, taken in conjunction with the accompanying drawings of which:

FIG. 13 is a flowchart illustrating a color calibration method of a color calibration apparatus according to an exemplary embodiment.

Throughout the drawings, like reference numerals will be understood to refer to like parts, components and structures.

DETAILED DESCRIPTION OF THE EXEMPLARY EMBODIMENTS

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 1:
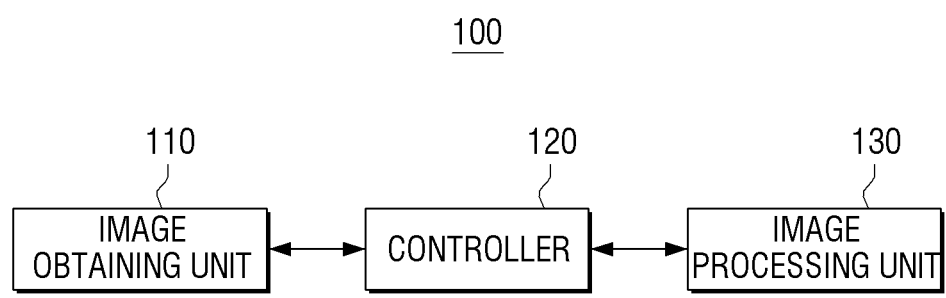
FIG. 1 is a block diagram illustrating a configuration of a color calibration apparatus according to an exemplary embodiment.
Figure 2:
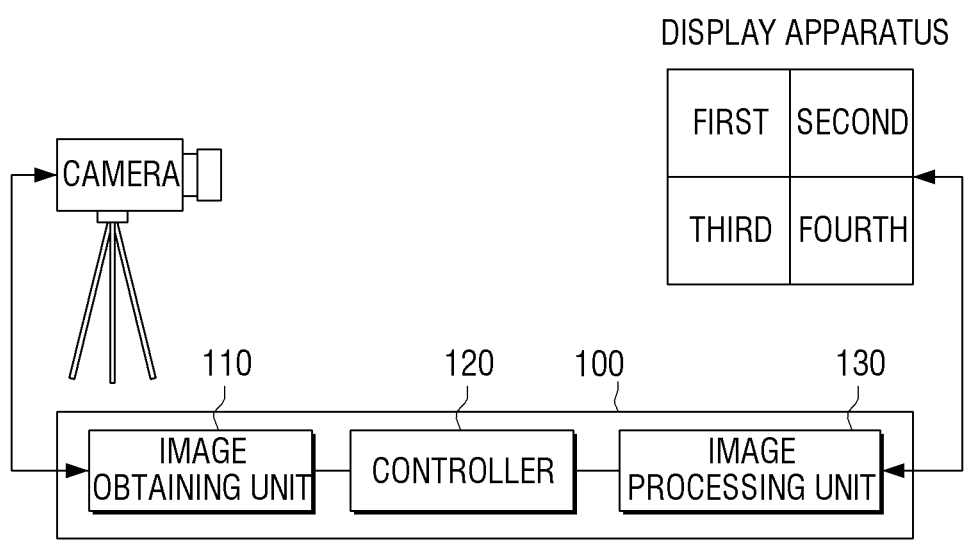
FIG. 2 is a view illustrating a state in which color calibration of a display device is performed by using the color calibration apparatus according to FIG. 1.

FIG. 1 is a block diagram illustrating a configuration of a color calibration apparatus according to an exemplary embodiment, and FIG. 2 is a view illustrating a state in which a color calibration of a display device is performed by using the color calibration apparatus according to FIG. 1.

Referring to FIG. 1, a color calibration apparatus 100 according to an exemplary embodiment includes an image obtaining unit 110, a controller 120, and an image processing unit 130.

The image obtaining unit 110 is a component configured to obtain an external image. Particularly, the image obtaining unit 110 obtains a first photographed image that is generated by photographing a first mono-color test image being displayed on a display device and a second photographed image that is generated by photographing a second mono-color test image being displayed on the display device.

According to an exemplary embodiment, the first mono-color test image is a mono-color test image for determining an effect of ambient light, and the second mono-color test image is a mono-color test image for performing color calibration. The first and second mono-color test images are generated in the color calibration apparatus 100, and then displayed in the display device.

To achieve this configuration, the color calibration apparatus 100 may be connected to the display device through a local wireless communication method such as WiFi, Bluetooth, Zigbee, etc., or a wired connection via cables. Also, the color calibration apparatus 100 may control the display device through such a connection so as to display images generated in the color calibration apparatus 100 on the display device.

According to an exemplary embodiment, the color calibration apparatus 100 may turn off a backlight unit (BLU) of the display device, and transmit values of red (R), green (G), and blue (B) corresponding to the first or second mono-color test image generated in the color calibration apparatus 100 to the display device so as to display the generated test images.

Alternatively, the image obtaining unit 110 may obtain a photographed image by photographing an image displayed on the display device through a photographing device. According to an exemplary embodiment, the photographing device may be implemented as any of various types of devices which can photograph an external image, such as, for example, a camera or camcorder.

According to an exemplary embodiment, the photographing device may be configured to be included in the image obtaining unit 110, or may have a configuration in which the photographing device is separately provided on the outside of the color calibration apparatus 100 and transmits photographed images to the image obtaining unit 110.

Particularly, the photographing device separately provided on the outside of the color calibration apparatus 100 may be connected to the color calibration apparatus 100 through a local wireless communication or a wired cable, and thus, the image obtaining unit 110 of the color calibration apparatus 100 may obtain a photographed image that is generated by photographing the display device from the connected photographing device.

Accordingly, the image obtaining unit 110 may obtain a first photographed image by photographing the first mono-color test image displayed on the display device, and may obtain a second photographed image by photographing the second mono-color test image.

The controller 120 controls the overall operation of the color calibration apparatus 100. Particularly, the controller 120 may detect an ambient light area on which an ambient light is shining within the first photographed image by comparing each of a plurality of pixel values of the first photographed image, and then determine a remaining area with the exception of the ambient light area as a representative value calculating area.

To achieve this technique, the controller 120 can measure each of the pixel values of the photographed image by an image processing operation, and compare each of the measured pixel values. According to an exemplary embodiment, the pixel values may be R, G, and B values of each of a plurality of the pixels of the photographed image. Since an image processing method to measure the pixel values of an image is a known technology, an explanation thereof will be omitted. It is assumed, according to an exemplary embodiment, that (R, G, B) represents R, G, and B values of a pixel.

Also, the controller 120 may determine the ambient light area on which an ambient light is shining by comparing each of the pixel values of the photographed image, and then determining an area of the photographed image with the exception of the ambient light area as the representative value calculating area.

The area on which the ambient light is shining and an area on which the ambient light is not shining within the photographed image may be distinguished by comparing the measured R, G, and B values, as well as, for example, by performing a comparison using the naked eye. Generally, the R, G, and B values of a pixel exist between (0, 0, 0) of a black color and (255, 255, 255) of a white color, and a brighter color has a relatively larger value. Since the area on which the ambient light is shining is tinged with a bright color relative to the area on which the ambient light is not shining, pixel values of the area on which the ambient light is shining have R, G, and B values relatively larger than the pixel values of the area on which the ambient light is not shining.

For example, if there is an area of pixels having the measured R, G, and B values close to (120, 110, 120) and an area of pixels having the R, G, and B values close to (60, 80, 80), the area of pixels having the value close to (120, 110, 120) may be determined as an ambient light area on which the ambient light is shining, and a remaining area with the exception of the area may be determined as a representative value calculating area.

The image processing unit 130 (e.g., image processor) calculates a representative value by using pixel values of an area corresponding to the representative value calculating area within the second photographed image, and performs color calibration of the display device by using the calculated representative value.

When the second photographed image is obtained through the image obtaining unit 110, the image processing unit 130 may measure pixel values of the area corresponding to the representative value calculating area within the second photographed image through the image processing, and then calculate a representative value of the second photographed image by using the measured values. According to an exemplary embodiment, the representative value calculating area is the area which is not affected by the ambient light determined within the first photographed image by the controller 120, as described above.

Accordingly, the image processing unit 130 may perform color calibration by using only pixel values of the area which is not affected by the ambient light within the second photographed image, namely, the representative value calculating area. In detail, the image processing unit 130 performs color calibration by calculating the representative value. According to an exemplary embodiment, the representative value may be one of an average value and a median value of the pixel values of pixels within an area corresponding to the representative value calculating area within the second photographed image, but is not limited thereto.

The image processing unit 130 may perform the color calibration by comparing the calculated representative value and a target value. In detail, if a difference between the representative value and the target value is greater than a predetermined threshold value, the image processing unit 130 may perform color calibration by adjusting R, G, and B gains of the display device. According to an exemplary embodiment, the target value is a pixel value of a final target image to be calibrated through the color calibration of the display device.

To achieve this, the color calibration apparatus 100 may be connected to the display device through a wired-connection method by a cable or a local wireless communication method so as to adjust the R, G, and B gains of the display device.

Hereinafter, an example of a color calibration process performed by the display device which is based on adjustment of R, G, and B gains of the image processing unit will be described. Only an R value will be explained as one example; however, color calibration for G and B also may be performed in the same way.

When the color calibration apparatus 100 transmits a value of 255 as a second mono-color test image to the display device and an R gain value of the display device is 1, the display device displays a screen corresponding to the value of 255. It is assumed, for exemplary purposes, that a representative value calculated through an area corresponding to the representative value calculating area within a second photographed image which is generated by photographing the screen is 100. (Since the representative value is a value measured through image processing of pixel values which are not affected by the ambient light within the second photographed image photographed by a photographing device, the representative value should be measured to be lower than a setting value of the display device.)

At this time, if a target value of the color calibration is 98, and the predetermined threshold value is 1, the image processing unit 130 compares the representative value of 100 and the target value of 98. Since a difference between the values is greater than the threshold value of 1, the image processing unit 130 adjusts the R gain value of the display device from 1 to $98/100$ (=0.98). Accordingly, when the color calibration apparatus 100 again transmits a value of 255 as the second mono-color test image, the display device displays an image corresponding to 255×0.98 (=249.9).

In theory, if the value of 255 of the display device is measured as 100 in the second photographed image, the value of 249.9 may have a value of 98 in the photographed image. Accordingly, a value corresponding to 255 of the display device is calibrated to 98 of the desired target value on the photographed image.

Hereinafter, a process and effect of color calibration of the color calibration apparatus 100 will be explained in detail with reference to FIGS. 3 and 4.

Figure 3:
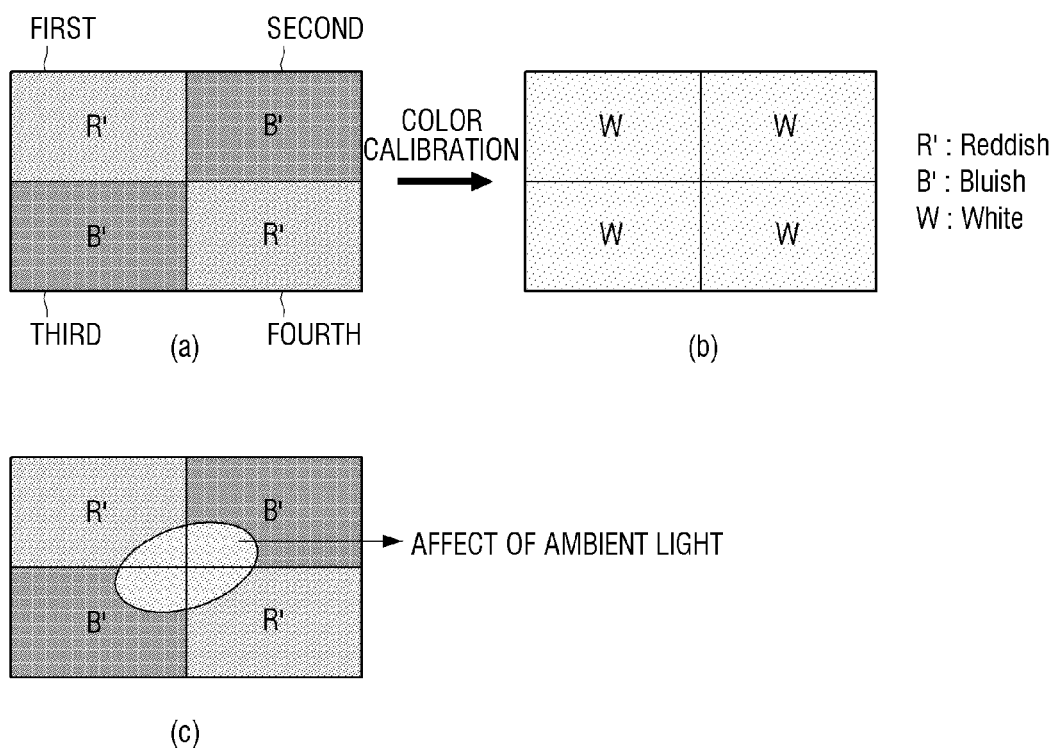
FIG. 3 shows views for explaining an effect of ambient light when performing color calibration by using a photographed image.

FIG. 3 shows views for explaining an effect of ambient light when performing color calibration by using a photographed image.

A color calibration method may be, for example, a method of performing color calibration by causing a color calibration apparatus to be directly in contact with the display device, and a method of performing the color calibration through an image that is generated by photographing the display device through a photographing device. In the latter case, if an ambient light is shining on the display device, an area which is affected by the ambient light appears in the image.

(a) of FIG. 3 illustrates a case in which, although all of the first to fourth display devices of the display apparatus (a video wall) of FIG. 2 are intended to display a white color by each of the display devices displaying R, G, and B values corresponding to the white color (e.g., 255, 255, 255), the first and fourth display devices instead display a reddish screen, and the second and third display devices display a bluish screen, so that a color-difference occurs between the first to fourth display devices.

When a plurality of display devices configures a large display screen, such a color difference between the display devices outputs an unnatural screen. Therefore, each of the plurality of display devices should be calibrated with a uniform white color as illustrated in (b) of FIG. 3.

When the method of performing the color calibration through a photographed image that is generated by photographing the display screen is selected as the color calibration method of the display device, if there is an ambient light shining on the display device, an effect of the ambient light appears in the photographed image as illustrated in (c) of FIG. 3, so that it is difficult to perform precise color calibration.

Figure 4:
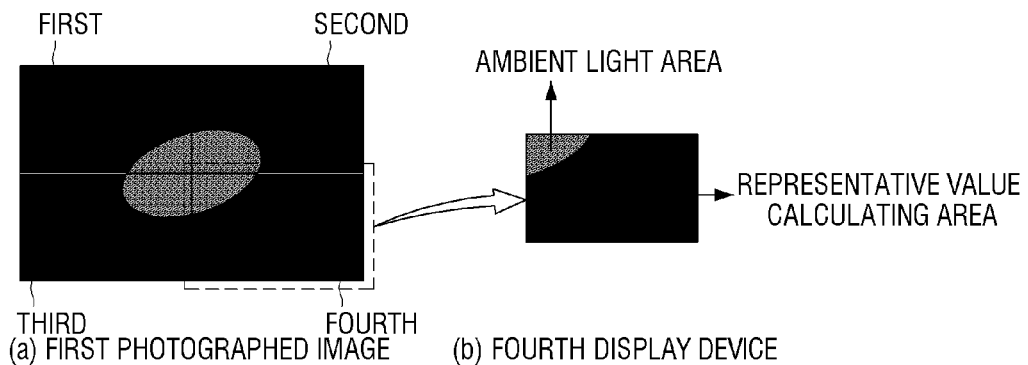
FIG. 4 shows views for explaining a process of performing color calibration performed by a color calibration apparatus according to an exemplary embodiment.
Figure 4:
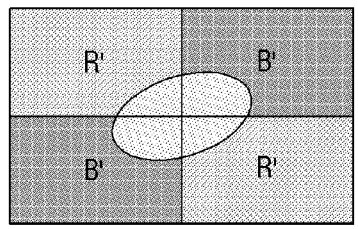
Figure 4:
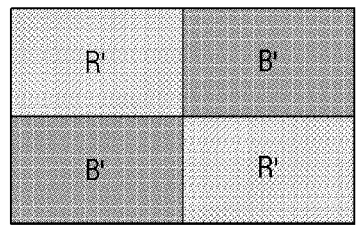
Figure 4:
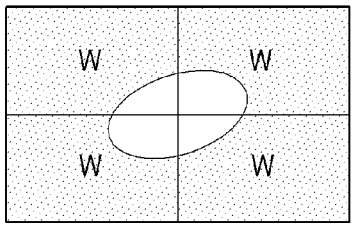

FIG. 4 shows views for explaining a color calibration process performed by a color calibration apparatus 100 according to an exemplary embodiment. The display device will be described with reference to the video wall of FIG. 2 including the first to fourth display devices.

The color calibration apparatus 100 may display a first mono-color test image on the display device in order to determine an effect of the ambient light, and the image obtaining unit 110 may obtain a first photographed image that is generated by photographing the first mono-color test image. The first mono-color test image is used to determine the effect of the ambient light by detecting an area which the ambient light shines on. Therefore, in order for the effects of the ambient light to clearly appear, for example, an image of the display device when a backlight unit (BLU) of the display device is turned off or a dark color image may be used as the first mono-color test image, but the first mono-color test image is not limited thereto.

(a) of FIG. 4 illustrates a first photographed image obtained by the image obtaining unit 110, which illustrates that the center of the video wall is affected by the ambient light, which may be, for example, the sun's rays, light generated by artificial lighting, etc.

The controller 120 detects an ambient light area on which the ambient light is shining within the first photographed image by comparing pixel values of the first photographed image, and then determines a remaining area with the exception of the area as a representative value calculating area.

(b) of FIG. 4 is an enlarged view of the fourth display device of the display apparatus of (a) of FIG. 4. The controller 120 measures each of the pixel values by image processing of the first photographed image, and then detects an area in which there are pixels with relatively high values by comparing the measured pixel values, and sets the area in which there are pixels with relatively high values as an ambient light area on which the ambient light is shining. Accordingly, the controller 120 may determine the remaining area with the exception of the ambient light area as the representative value calculating area which is not affected by the ambient light. The ambient light areas and representative value calculating areas of the remaining first to third display devices may be calculated in the same fashion as described above with respect to the fourth display device.

After the representative value calculating area is determined by the controller 120, the color calibration apparatus 100 generates and displays a second mono-color test image for the color calibration on the display device in order to enable the image processing unit 130 to perform the color calibration. The second mono-color test image may be a white image, but is not limited thereto.

(c) of FIG. 4 illustrates a second photographed image obtained by the image obtaining unit 110. When the second mono-color test image is a white color, the color calibration apparatus 100 displays R, G, and B values corresponding to the white color (e.g., 255, 255, 255) on each of the display devices.

Since it is assumed in this example that each of the display devices may require color calibration due to color differences, the first and fourth display devices display a reddish white color, and the second and third display devices display a bluish white color. Also, since the ambient light is still shining on the display apparatus, the second photographed image obtained by the image obtaining unit 110 is an image as illustrated in (c) of FIG. 4. It is understood that each of the display devices may not require color calibration in other examples.

The image processing unit 130 may calculate a representative value from each of the display devices by using the pixel values of the second photographed image corresponding to the representative value calculating area of each of the display devices determined by the controller 120 within the obtained second photographed image. According to an exemplary embodiment, the representative value may be one of an average value and a median value of the pixel values of pixels within an area corresponding to the representative value calculating area within the second photographed image, but is not limited thereto.

Since the pixel values of the ambient light area within the second photographed image are excluded when calculating the representative value and the second photographed image is calibrated by the representative value of each of the display devices, the color calibration may be performed while excluding the effect of the ambient light. (d) of FIG. 4 illustrates the second photographed image calibrated by the representative value.

The image processing unit 130 performs color calibration of the display device to achieve the intended white color by using the calibrated second photographed image, namely, the representative value of each of the display units. Such a process was described in detail in the explanation of the image processing unit 130 of FIG. 1. Therefore, an explanation thereof will be omitted.

(e) of FIG. 4 illustrates a resulting image from performing the color calibration. Referring to (e) of FIG. 4, it can be seen that all the screens of the display devices are calibrated to the white color. However, the effect of the ambient light still remains.

According to exemplary embodiments, the reason that the color calibration is performed is because when the ambient light moves or disappears depending on the time, for example, when the ambient light is sunlight, if the color calibration is performed while including pixel values of an area on which the ambient light is shining, the area on which the ambient light is shining may change depending on the time so that the result of the color calibration becomes rather inaccurate.

According to an exemplary embodiment of the present disclosure as described above, since the color calibration is performed by replacing the pixel values of the area on which the ambient light is shining with the pixel values of the area on which the ambient light is not shining, namely, a representative value, constant color calibration results can be obtained regardless of a change of the ambient light. Therefore, the accuracy of the color calibration may be enhanced. Also, since the photographed image is used, the color calibration of multiple display devices can be performed at the same time. Therefore, the time it takes to perform the color calibration may be shortened, and limitation of areas may be reduced.

Figure 5:
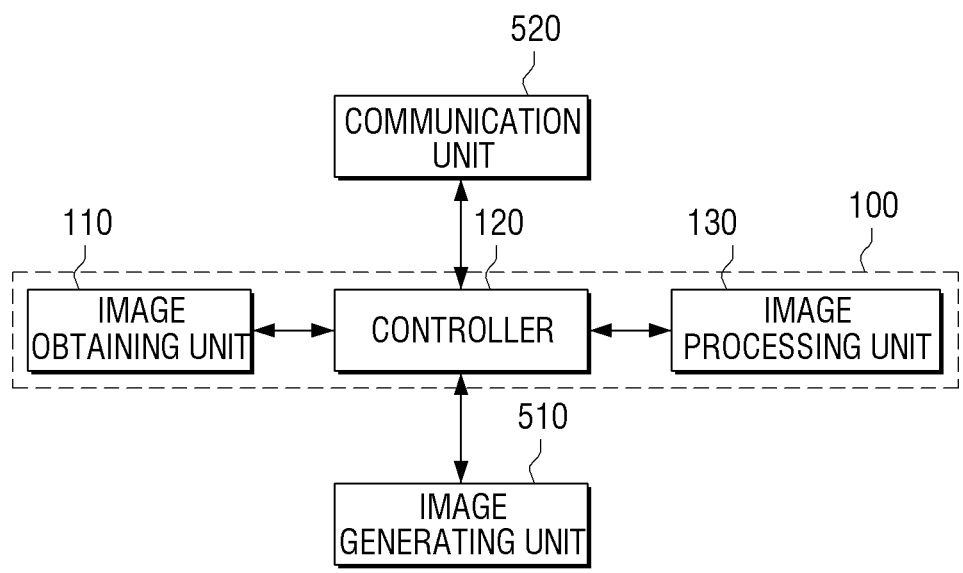
FIG. 5 is a block diagram illustrating a configuration of a color calibration apparatus according to another exemplary embodiment.
Figure 6:
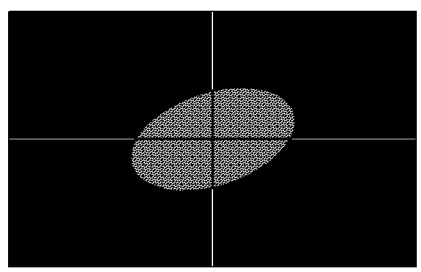
FIG. 6 shows views for explaining a color calibration performing process of the color calibration apparatus according to FIG. 5.
Figure 6:
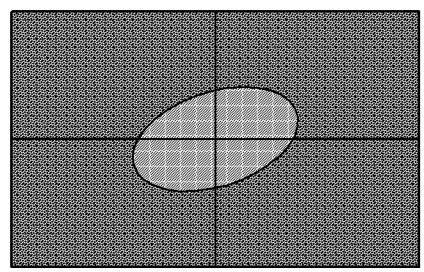
Figure 6:
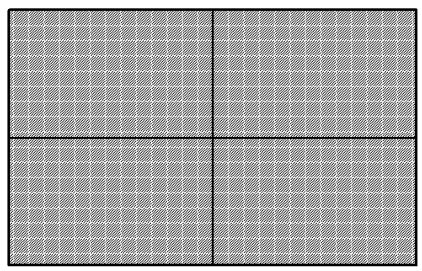
Figure 6:
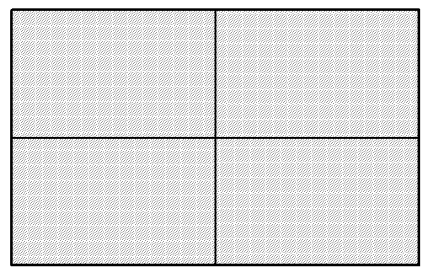

FIG. 5 is a block diagram illustrating a configuration of a color calibration apparatus according to another exemplary embodiment, and FIG. 6 is a view for explaining a process of determining a representative value calculating area by the color calibration apparatus 500 according to FIG. 5.

Referring to FIG. 5, a color calibration apparatus 500 includes an image obtaining unit 110, a controller 120, an image processing unit 130, an image generating unit 510, and a communication unit 520.

Referring to FIG. 5, the image generating unit 510 (e.g., image generator) may generate a plurality of first mono-color test images. To achieve this, the image generating unit 510 may generate the first mono-color test images by generating R, G, and B values so that pixels corresponding to the entire screen of the display device have the same R, G, and B values. For example, if it is desired to generate the first mono-color test image of a black color (e.g., 0, 0, 0), the R, G, and B values of all pixels corresponding to the entire screen of the display device to be transmitted to the display device are (0, 0, 0). In this way, any number of the first mono-color test images with specific R, G, and B values may be generated.

Since the ambient light is a bright color, the ambient light may be more clearly revealed against an image of a dark color. Since the first mono-color test image is used to determine the ambient light area on which the ambient light is shining, the image generating unit 510 may generate a black or dark mono-color image as the first mono-color test image. However, the first mono-color test image is not limited thereto.

The communication unit 520 is a component configured to transmit a plurality of first mono-color test images generated in the image generating unit 510 to the display device. To achieve this, the communication unit 520 may be connected to the display device by a wired connection through a cable or by a local wireless communication technology. Also, the R, G, and B data corresponding to the first mono-color test image may be transmitted to the display device through this connection. According to an exemplary embodiment, the local wireless communication technology may use any type of local wireless communication technology that can connect the color calibration apparatus 500 and the display device, and control the display device, such as, for example, WiFi, Bluetooth, Zigbee, etc.

Accordingly, the color calibration apparatus 500 may display the predetermined number of first mono-color test images generated in the image generating unit 510 on the display device through the communication unit 520 in order from lowest brightness to highest brightness. Also, the color calibration apparatus 500 may generate the first mono-color test image of a darkest color by turning off the backlight unit (BLU) of the display device through the communication unit 520, and then display the image on the display device. However, the order in which the plurality of first mono-color test images is displayed on the display device is not limited thereto.

The image obtaining unit 110 may obtain a plurality of first photographed images corresponding to the plurality of first mono-color test images displayed on the display device. To achieve this, the image obtaining unit 110 may photograph each of the plurality of first mono-color test images displayed on the display device through an image photographing device such as, for example, a camera, camcorder, etc., and then store the obtained photographed images in a storage unit.

The reason that the image generating unit 510 generates a plurality of first mono-color test images with different brightnesses is because, when the effect of the ambient light disappears from a first mono-color test image having a brightness above a certain brightness, there is no need to separately determine the representative value calculating area.

FIG. 6 shows views for explaining the color calibration as described above, and illustrates first photographed images that are generated by photographing the plurality of first mono-color test images displayed on the display apparatus (e.g., video wall). In FIG. 6, the order of (a), (b), (c), and (d) refers to the photographed images obtained in order from lowest brightness to highest brightness.

(a) of FIG. 6 illustrates a first photographed image obtained when the color calibration apparatus 500 turns off all the BLUs of the display apparatus. In this case, the effect of the ambient light can be seen. Also, it can be seen that the effect of the ambient light remains until (b) of FIG. 6, and disappears from (c) of FIG. 6, of which the brightness is further increased as compared to (a) and (b) of FIG. 6.

In this case, if an image having a brightness higher than that of (c) of FIG. 6 or a white image (the highest brightness) is used as the second mono-color test image for color calibration, the color calibration process of the image processing unit 130 is not affected by the ambient light. Accordingly, when performing the color calibration, it is not necessary to consider the effect of the ambient light.

Accordingly, if there is a first photographed image from which the ambient light area is not detected among a plurality of first photographed images obtained by the image obtaining unit 110, the controller 120 may determine an entire area of the first photographed image from which the ambient light area is not detected as the representative value calculating area.

When the same display devices are photographed, content of the photographed images may be different from each other, but the size of the entire area of each of the photographed images may be the same. Accordingly, when the controller 120 determines the entire area of the first photographed image as the representative value calculating area, this determination indicates that the image processing unit 130 should calculate a representative value by using entire pixel values of the second photographed image.

Accordingly, when the second photographed image is obtained, the image processing unit 130 calculates a representative value through the pixel values of the entire area of the obtained second photographed image, and then performs color calibration of the display device by using the calculated representative value.

Figure 7:
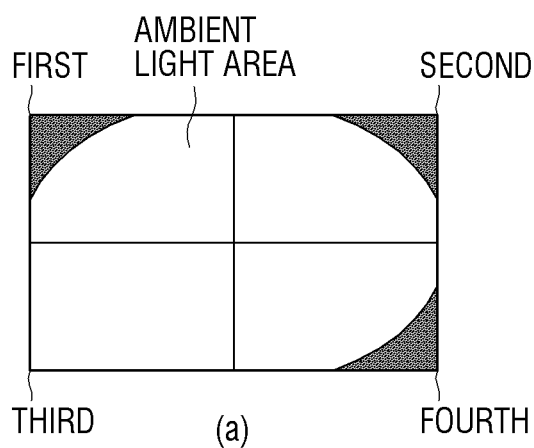
FIG. 7 shows views for explaining a case in which a representative value calculating area cannot be determined.
Figure 7:
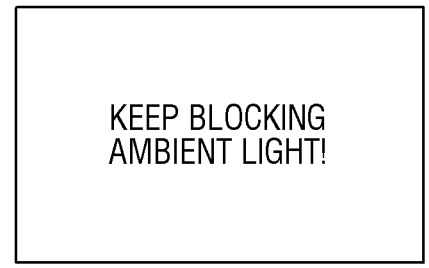

FIG. 7 shows views for explaining a case in which a representative value calculating area cannot be determined. (a) of FIG. 7 illustrates a case in which an ambient light area occupies most of the area of a display apparatus. Particularly, in a third display device, the ambient light is shining on the entire area of the third display device. Accordingly, the color calibration apparatus 100 cannot determine a representative value calculating area of the third display device.

In this case, the color calibration apparatus 100 may include a display unit to display warnings. (b) of FIG. 7 illustrates an exemplary embodiment of the display unit which displays warnings.

The display unit may be configured so that the warnings are displayed when the effect of the ambient light exceeds a predetermined level as well as when the ambient light is shining on the entire area of the display device, such as the third display device of (a) of FIG. 7.

Accordingly, after blocking the ambient light, for example, with curtains or another technique to block the ambient light, users may perform color calibration of the display device.

Figure 8:
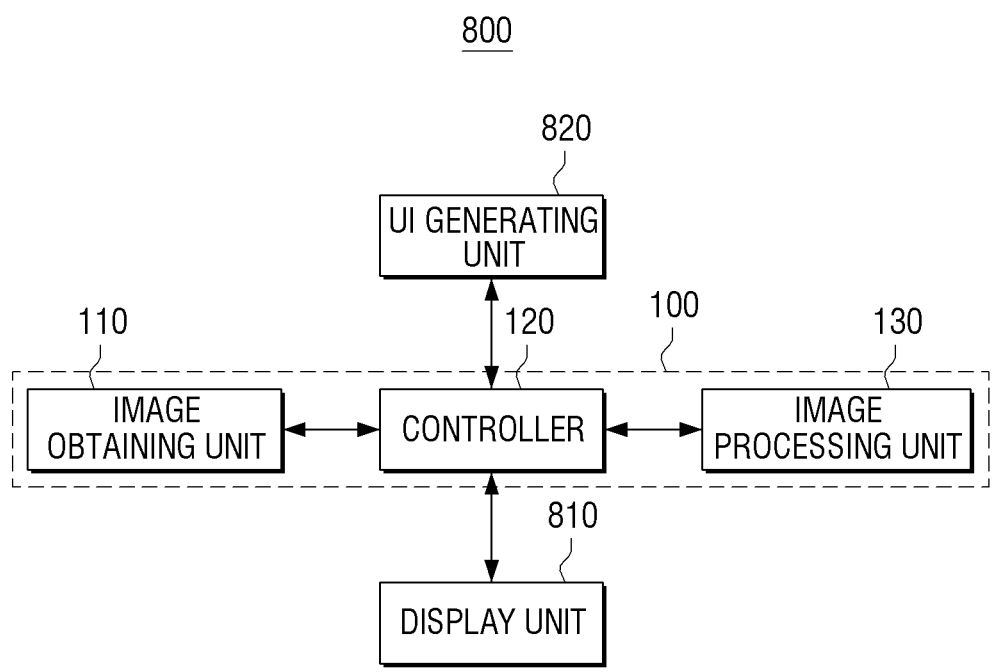
FIG. 8 is a view illustrating a configuration of a color calibration apparatus according to another exemplary embodiment.

FIG. 8 is a view illustrating a configuration of a color calibration apparatus according to another exemplary embodiment. Referring to FIG. 8, the color calibration apparatus 800 includes an image obtaining unit 110, a controller 120, an image processing unit 130, a display unit 810, and a UI generating unit 820.

The UI generating unit 820 (e.g., UI generator) generates at least one user interface (UI) to receive a user's commands.

Particularly, the UI generating unit 820 may generate a mode selection UI which enables a user to select one of an automatic ambient light calibration mode and a manual ambient light calibration mode. Then, when a manual mode is selected from the mode selection UI, the UI generating unit 820 may generate a UI for specifying a representative value calculating area.

The display unit 810 displays a variety of screens. Particularly, the display unit 810 may display the mode selection UI. Also, when the manual mode is selected, the display unit 810 may display a first photographed image obtained by the image obtaining unit 110 and the UI for specifying the representative value calculating area within the first photographed image. To achieve this, the display unit 810 may be implemented as a liquid crystal display panel (LCD), an organic light emission diode display (OLED), etc., but is not limited thereto.

The controller 120 controls overall operations of the color calibration apparatus 800. Particularly, when an automatic mode is selected from the ambient light calibration mode selection UI displayed on the display unit 810, the controller 120 may detect an ambient light area on which the ambient light is shining within the first photographed image by comparing pixel values of the first photographed image obtained by the image obtaining unit 110, and determine the remaining area with the exception of the ambient light area as the representative value calculating area.

Also, when a manual mode is selected from the ambient light calibration mode selection UI displayed on the display unit 810, the controller 120 may control the display unit 810 to display the first photographed image and the UI for specifying the representative value calculating area within the first photographed image. Then, if an area is specified in the UI, the controller 120 may determine the specified area as the representative value calculating area.

After the representative value calculating area is determined, the color calibration apparatus 800 displays a second mono-color test image on the display device. When a second photographed image is obtained by the image obtaining unit 110, the image processing unit 130 may calculate a representative value by using pixel values of an area corresponding to the representative value calculating area within the second photographed image, and then perform color calibration of the display device by using the calculated representative value.

Figure 9:
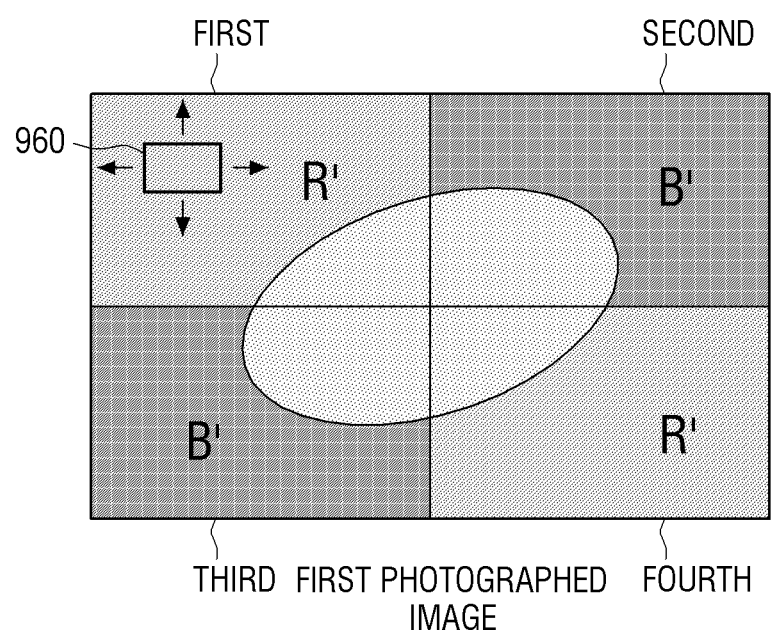
FIG. 9 is a view illustrating a screen of a display unit when an ambient light calibration mode is a manual mode.

A case in which the ambient light calibration mode is selected as the manual mode will be described in detail with reference to FIG. 9. FIG. 9 illustrates a screen of the display unit 810 on which a first photographed image and a UI 960 for specifying a representative value calculating area within the first photographed image are displayed when the ambient light calibration mode is selected as the manual mode in the color calibration apparatus 800 according to FIG. 8.

Referring to FIG. 9, after a user checks (e.g., with the naked eye) an ambient light area on which the ambient light is shining within the first photographed image displayed on the display unit 810, the user may directly specify a representative value calculating area by moving the UI 960 for specifying the representative value calculating area into an area which is not affected by the ambient light. As a result, the specified area is determined as the representative value calculating area, and the color calibration process thereafter is the same as described above.

In FIG. 9, the UI 960 for specifying the representative value calculating area is exemplarily represented as a rectangle; however, the UI 960 is not limited thereto. The UI 960 may be generated in many kinds of sizes and shapes such as a circle, triangle, arrow, etc. Also, many different techniques may be used to specify the representative value calculating area through the UI 960, such as, for example, a method to specify the representative value calculating area by moving the UI 960 using a mouse or a keyboard, or by enlarging or reducing the size of the UI 960.

Accordingly, since the user can specify the representative value calculating area with the naked eye, even when it is difficult to determine the representative value calculating area in the automatic mode as illustrated in an example of (a) of FIG. 7, the user can directly determine the representative value calculating area so that color calibration becomes possible.

FIGS. 10 and 11A-C are views illustrating exemplary embodiments of UIs for setting a target value. The configuration of a color calibration apparatus for explaining FIGS. 10 and 11A-11C may be the same as the configuration shown in FIG. 8. Therefore, FIGS. 10 and 11A-11C will be explained with reference to the configuration of FIG. 8.

According to the color calibration apparatus 800 according to an exemplary embodiment, after the controller 120 determines a representative value calculating area, the image processing unit 130 may calculate a representative value by using pixel values of an area corresponding to the representative value calculating area within the second photographed image, and perform color calibration of the display device by using the calculated representative value and a predetermined target value. According to an exemplary embodiment, the target value refers to a pixel value of a final target image to be calibrated through the color calibration. Accordingly, the target value is used in order for the image processing unit 130 to perform the color calibration.

To achieve this, the color calibration apparatus 800 as illustrated in FIG. 8 includes the image obtaining unit 110, the controller 120, the image processing unit 130, the display unit 810, and the UI generating unit 820. Hereinafter, descriptions of the configurations having the same functions as described above will be omitted.

The UI generating unit 820 generates a UI to receive the user's commands, and thus may generate a UI for setting the target value for the color calibration. The display unit 810 is configured to display a variety of screens. Particularly, the display unit 810 may display the UI for setting the target value for the color calibration. Accordingly, the user may set the target value through the UI for setting the target value displayed on the display unit 810 for the color calibration of the display device.

Figure 10:
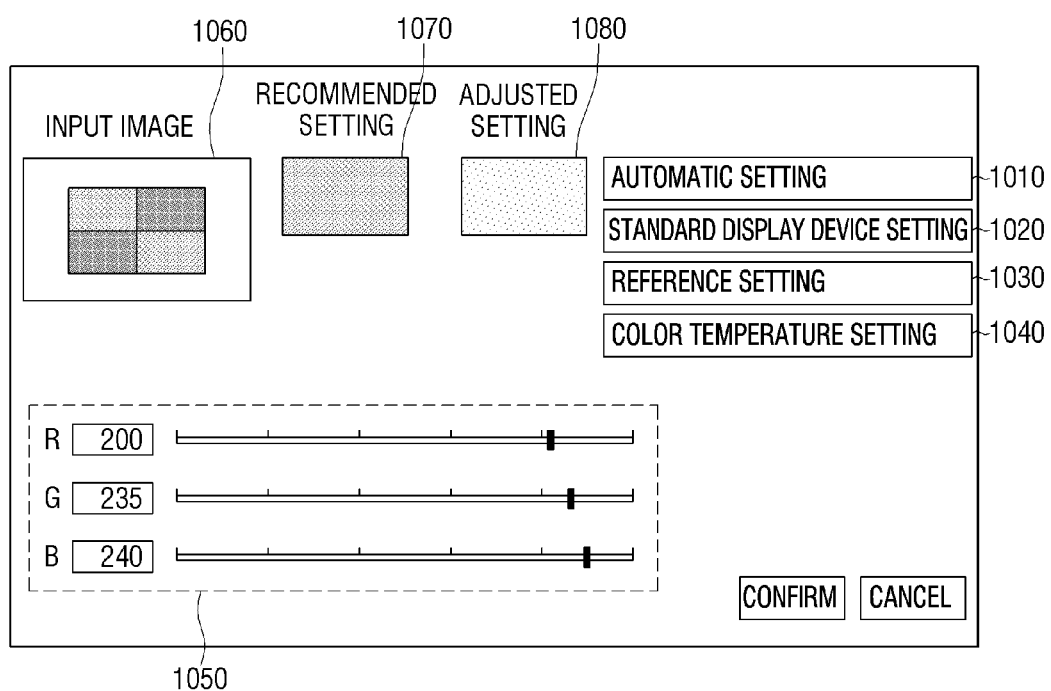
FIGS. 10 and 11A-11C are views illustrating an exemplary embodiment of a user interface (UI) for setting a target value.

According to FIG. 10, the UI for setting the target value may include at least one of an automatic setting menu 1010, a standard display device setting menu 1020, a reference setting menu 1030, a color temperature setting menu 1040, and a manual setting menu 1050.

The automatic setting menu 1010 may automatically set the target value, e.g., a white color (255, 255, 255). However, the automatic setting menu 1010 is not limited thereto and may automatically set other target values as well. The automatic setting menu 1010 may allow the target value to be automatically set without a separate operation of the user in a variety of ways, such as automatically setting pixel values of the brightest display device as the target value in a case of a video wall consisting of a plurality of display devices.

Figure 11A:
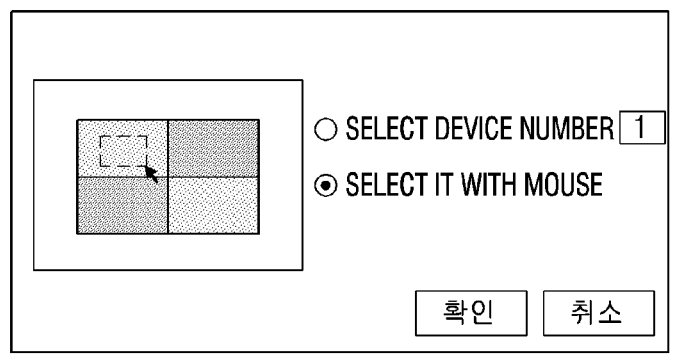

The standard display device setting menu 1020 is a menu for the user to select one display device from the second photographed image that is generated by photographing the video wall consisting of the plurality of display devices and to set pixel values corresponding to a photographed image of the selected display device as the target value. If this menu is selected, a screen as illustrated in FIG. 11A may be displayed on the display unit 810 so that the user is enabled to select a standard display device through a device number or operation of a mouse.

Figure 11B:
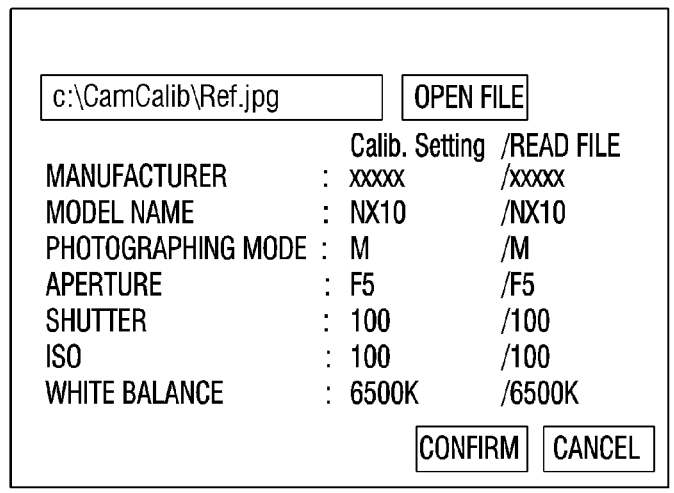

The reference setting menu 1030 is a menu to set a pixel value of a pre-stored reference image as the target value. If this menu is selected, an image stored in a file form as illustrated in FIG. 11B may be read and set as the target value. The stored reference image file may include information about a photographing device which photographed the reference image, such as a manufacturer, a model name, etc., or information about photographing conditions, such as a photographing mode, an aperture, a shutter, ISO, white balance, etc.

Figure 11C:
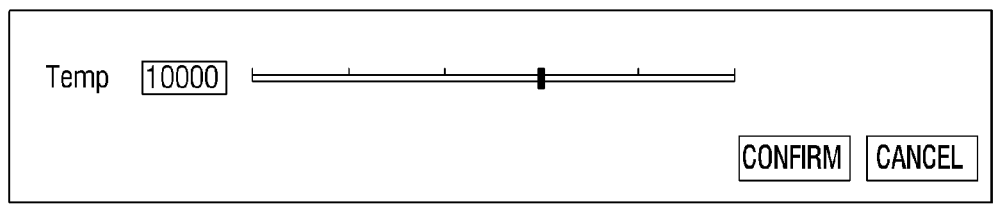

The color temperature setting menu 1040 is a menu to set the target value through color temperature adjustment of the user. If this menu is selected, the user may set the target value by directly adjusting the color temperature as illustrated in FIG. 11C.

The manual setting menu 1050 is a menu to set the target value by enabling the user to adjust R, G, and B values. As illustrated in FIG. 10, the user may set the target value by directly adjusting each of the R, G, and B values of an image.

Also, the display unit 810 may display the second photographed image in an input image area 1060, and allow the user to check settings or change the target value (e.g., with the naked eye) by displaying an image corresponding to the target value that is set from one of the automatic setting menu 1010, the standard display device setting menu 1020, the reference setting menu 1030, and the color temperature setting menu 1040 in a recommended setting area 1070 and an image corresponding to the target value adjusted by the manual setting menu 1050 in an adjustment setting area 1080.

The image processing unit 130 may perform color calibration of the display device by using the target value which may be set by a variety of ways as described above and the calculated representative value.

Figure 12:
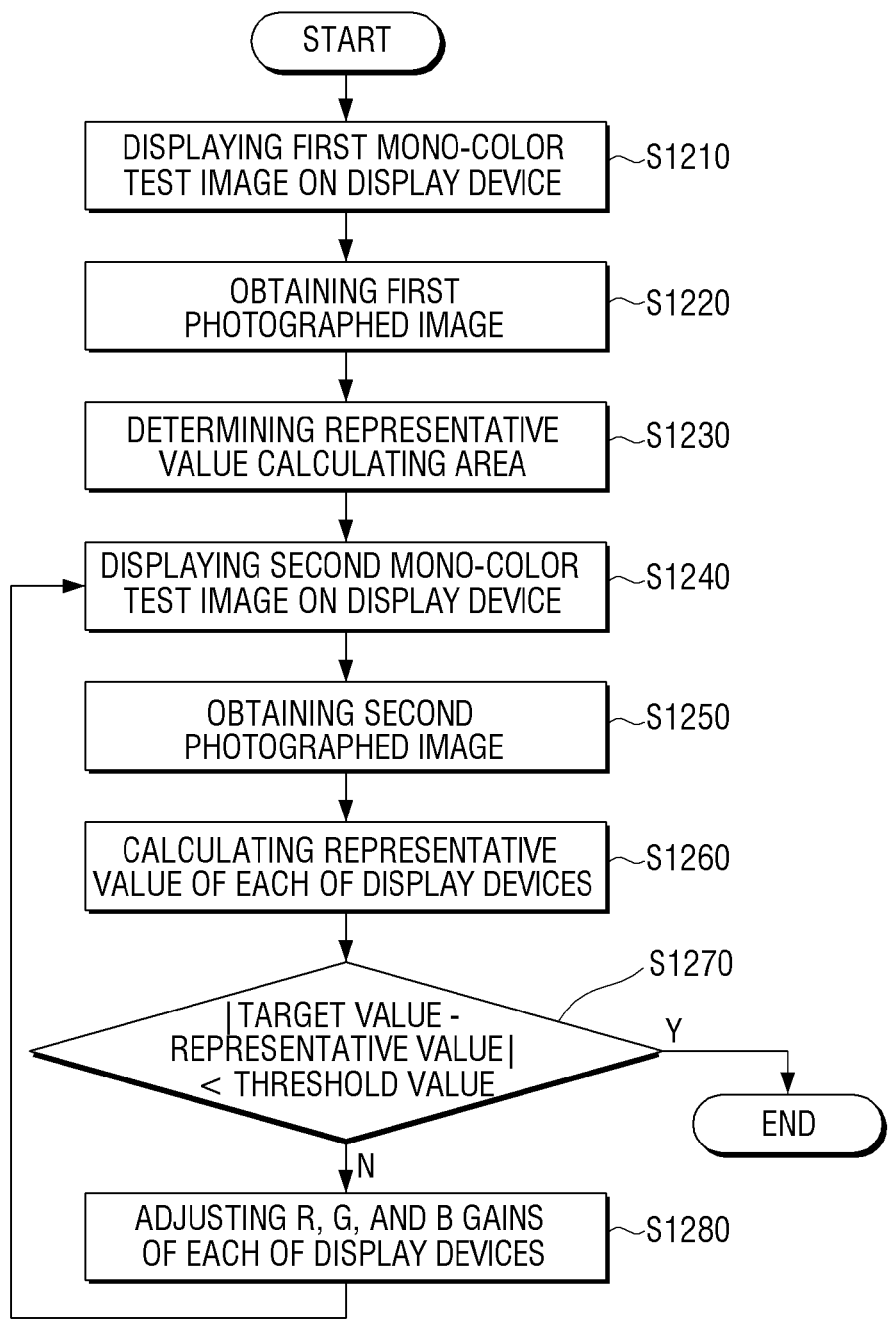
FIG. 12 is a flowchart for explaining a method of performing color calibration by using a target value and a representative value.

FIG. 12 is a flowchart for explaining a method in which the color calibration apparatus 100 according to an exemplary embodiment performs the color calibration by using the set target value and the calculated representative value as described above.

The color calibration apparatus 100 displays a first mono-color test image on a display device at operation S1210. Then, after the image obtaining unit 110 obtains a first photographed image which is generated by photographing the first mono-color test image displayed on the display device at operation S1220, the controller 120 detects an ambient light area on which an ambient light is shining within the first photographed image, and determines a remaining area with the exception of the ambient light area as a representative value calculating area at operation S1230.

After that, the image processing unit 130 performs a color calibration process of the display device. To achieve this, the color calibration apparatus 100 displays a second mono-color test image for the color calibration on the display device at operation S1240, and the image obtaining unit 110 obtains a second photographed image by photographing the second mono-color test image displayed on the display device at operation S1250. Then, the image processing unit 130 calculates a representative value of each of the display devices at operation S1260, and compares the calculated representative value and the set target value at operation S1270. If a difference therebetween is greater than a pre-set threshold value (operation 1270: N), the image processing unit 130 adjusts R, G, and B gains of the display device, and then repeatedly performs the color calibration process. If the difference between the representative value and the target value is less than the pre-set threshold value (operation 1270: Y), the color calibration is completed.

If the above process is described again in terms of considering the ambient light, the operations from operation S1210 to operation S1230 are processes to consider the effect of the ambient light by determining the representative value calculating area. After that, the effect of the ambient light is substantially excluded because the image processing unit 130 calculates the representative value by using pixel values of an area corresponding to the representative value calculating area within the second photographed image in the color calibration process. In a process of adjusting the R, G, and B gains of the display device by comparing the representative value and the target value, the color calibration of the display device is performed.

Accordingly, in the process of performing the color calibration as described above, the effect of the ambient light is excluded, and the color calibration of the display device is performed so that an error from the target value comes within an error range of less than the predetermined threshold value.

The target value may be set by displaying the UI (see FIG. 10) for setting the target value on the display unit 810, and may be set before the image processing unit 130 compares the target value and the representative value at operation S1270.

FIG. 13 is a flowchart illustrating a color calibration method of a color calibration apparatus according to an exemplary embodiment. Referring to FIG. 13, the image obtaining unit 110 obtains a first photographed image which is generated by photographing a first mono-color test image displayed on the display device at operation S1310, and then the controller 120 detects an ambient light area on which an ambient light is shining within the first photographed image by comparing pixel values of the first photographed image, and determines a remaining area with the exception of the ambient light area as a representative value calculating area at operation S1320. Next, the image obtaining unit 110 obtains a second photographed image which is generated by photographing a second mono-color test image displayed on the display device at operation S1330, and then the image processing unit 130 calculates a representative value by using pixel values of an area corresponding to the representative value calculating area within the second photographed image at operation S1340, and performs color calibration of the display device by using the representative value at operation S1350.

As described above, according to various exemplary embodiments, when performing color calibration of the display device by using a photographed image which is generated by photographing the display device, color calibration is performed in consideration of the effect of ambient light so that accuracy of the color calibration may be increased. Also, since the photographed image is used, the color calibration of multiple display devices can be performed at the same time, so that the time it takes to perform the color calibration may be shortened and limitations of areas may be reduced.

Also, color calibration methods according to various exemplary embodiments as described above may be generated as software, and then may be loaded in a color calibration apparatus.

In detail, according to an exemplary embodiment, a non-transitory computer-readable medium stores a program which causes a computer (e.g., a color calibration apparatus) to perform the operations of obtaining a first photographed image which is generated by photographing a first mono-color test image displayed on a display device, detecting an ambient light area on which an ambient light is shining within the first photographed image by comparing pixel values of the first photographed image, determining a remaining area with the exception of the ambient light area as a representative value calculating area, obtaining a second photographed image which is generated by photographing a second mono-color test image displayed on the display device, calculating a representative value by using pixel values of an area corresponding to the representative value calculating area within the second photographed image, and performing color calibration of the display device by using the representative value.

Unlike a medium to store data for a short period, such as a register, a cache, a memory, etc., the non-transitory computer-readable medium according to an exemplary embodiment refers to a medium that can store data in a semi-permanent manner and that can be read by devices. In detail, the above-described exemplary embodiments may be implemented as a CD, a DVD, a hard disc, a Blu-ray disc, a USB, a memory card, a ROM, etc., and various types of middleware or other programs may be stored in and provided with the non-transitory computer readable medium.

While the exemplary embodiments have been described above, additional variations and modifications of the exemplary embodiments may occur to those skilled in the art. Therefore, it is intended that the appended claims shall be construed to include both the above exemplary embodiments and all such variations and modifications that fall within the spirit and scope of the inventive concepts.

What is claimed is:

1. A color calibration apparatus for performing color calibration on a plurality of display devices constituting a video wall, the color calibration apparatus comprising:
    an image obtaining unit configured to obtain first photographed images which are generated by photographing first mono-color test images displayed on each of the plurality of display devices and obtain second photographed images which are generated by photographing second mono-color test images displayed on each of the plurality of display devices;
    a controller configured to detect an ambient light area on which an ambient light is shining within the first photographed image based on pixel values of the first photographed image, and further configured to determine a remaining area of the first photographed image other than the ambient light area as a representative value calculating area; and
    an image processor configured to calculate a representative value based on pixel values of an area corresponding to the representative value calculating area within the second photographed image, and further configured to perform color calibration of the plurality of display devices based on the representative value,
    wherein the first and second mono-color test images are generated by the color calibration apparatus, transmitted to each of the plurality of display devices, and different from each other.

2. The color calibration apparatus of claim 1, wherein:
    the image processor is configured to calculate one of an average value and a median value of the pixel values of the area corresponding to the representative value calculating area within the second photographed image as the representative value.

3. The color calibration apparatus of claim 1, further comprising:
    an image generator configured to generate a plurality of first mono-color test images; and
    a communication unit configured to transmit the plurality of first mono-color test images to the plurality of display devices,
    wherein the image obtaining unit is configured to obtain a plurality of first photographed images corresponding to the plurality of first mono-color test images, and,
    in response to determining that one of the first photographed images is a first photographed image within which the ambient light area is not detected among the plurality of first photographed images, the controller determines an entire area of the first photographed image within which the ambient light area is not detected as the representative value calculating area.

4. The color calibration apparatus of claim 1, further comprising:
    a user interface (UI) generator configured to generate a mode selection UI which enables a user to select one of an automatic ambient light calibration mode and a manual ambient light calibration mode; and
    a display unit configured to display the mode selection UI,
    wherein, if the automatic ambient light calibration mode is selected in the mode selection UI, the controller detects the ambient light area on which the ambient light is shining within the first photographed image based on the pixel values of the first photographed image, and determines the remaining area of the first photographed image other than the ambient light area as the representative value calculating area, and
    if the manual ambient light calibration mode is selected in the mode selection UI, the controller controls the display unit to display the first photographed image and a UI which enables the user to specify an area within the first photographed image, and, when the area is specified in the UI, the controller determines the specified area as the representative value calculating area.

5. The color calibration apparatus of claim 1, further comprising:
    a display unit configured to display a warning if an effect of the ambient light exceeds a predetermined level.

6. The color calibration apparatus of claim 1, further comprising;
    a UI generator configured to generate a UI screen to set a target value for the color calibration, and
    a display unit configured to display the UI screen;
    wherein the image processor performs the color calibration of the display device based on the target value set through the UI screen and the representative value.

7. The color calibration apparatus of claim 6, further comprising:
    an image generator configured to generate the second mono-color test images; and
    a communication unit configured to transmit the second mono-color test images to the display device,
    wherein the controller provides the second mono-color test image to the display device to display the second mono-color test image, and,
    the image processor compares the representative value and the target value, and, if a difference between the representative value and the target value is greater than a predetermined threshold value, the image processing unit adjusts R, G, and B gains of the display device and repeatedly performs the color calibration.

8. The color calibration apparatus of claim 6, wherein the UI screen comprises at least one of an automatic setting menu to automatically set the target value in response to selecting the automatic setting menu, a standard display device setting menu to select a standard image to set the target value among a plurality of the second photographed images of the display device, a reference setting menu to set a pixel value of a stored reference image as the target value, a color temperature setting menu to set the target value through color temperature adjustment, and a manual setting menu to set the target value through adjustment of R, G, and B values.

9. A color calibration method of a color calibration apparatus, comprising:
   obtaining a first photographed image which is generated by photographing a first mono-color test image displayed on a display device;
   detecting an ambient light area on which an ambient light is shining within the first photographed image based on pixel values of the first photographed image, and determining a remaining area of the first photographed image other than the ambient light area as a representative value calculating area;
   obtaining a second photographed image which is generated by photographing a second mono-color test image displayed on the display device;
   calculating a representative value based on pixel values of an area corresponding to the representative value calculating area within the second photographed image; and
   performing color calibration of the display device based on the representative value,
   wherein the first and second mono-color test images are different from each other.

10. The color calibration method of claim 9, wherein the calculating of the representative value comprises calculating one of an average value and a median value of the pixel values of the area corresponding to the representative value calculating area within the second photographed image as the representative value.

11. The color calibration method of claim 9, further comprising:
   generating a plurality of first mono-color test images; and
   transmitting the plurality of first mono-color test images to the display device,
   wherein the obtaining of the first photographed image comprises obtaining a plurality of first photographed images corresponding to the plurality of first mono-color test images, and
   the determining of the representative value calculating area comprises determining, in response to determining that one of the first photographed images is a first photographed image within which the ambient light area is not detected among the plurality of first photographed images, an entire area of the first photographed image within which the ambient light area is not detected as the representative value calculating area.

12. The color calibration method of claim 9; further comprising:
   generating a mode selection user interface (UI) which enables a user to select one of an automatic ambient light calibration mode and a manual ambient light calibration mode; and
   displaying the mode selection UI,
   wherein, if the automatic ambient light calibration mode is selected in the mode selection UI, the determining of the representative value calculating area comprises detecting the ambient light area on which the ambient light is shining within the first photographed image based on the pixel values of the first photographed image, and determining the remaining area of the first photographed image other than the ambient light area as the representative value calculating area, and
   if the manual ambient light calibration mode is selected in the mode selection UI, the color calibration method further comprises displaying the first photographed image and a UI to specify an area within the first photographed image, and, when the area is specified using the UI, the determining of the representative value calculating area comprises determining the specified area as the representative value calculating area.

13. The color calibration method of claim 9, further comprising:
   displaying a warning if an effect of the ambient light exceeds a predetermined level.

14. The color calibration method of claim 9, further comprising:
   generating a UI screen to set a target value for the color calibration; and
   displaying the UI screen,
   wherein the performing of the color calibration comprises performing the color calibration of the display device by using the target value set through the UI screen and the representative value.

15. The color calibration method of claim 14, wherein the performing of the color calibration comprises:
   comparing the representative value and the target value, and
   adjusting, if a difference between the representative value and the target value is greater than a predetermined threshold value, R, G, and B gains of the display device, and repeatedly performing the obtaining of the second photographed image, the calculating of the representative value, and the performing of the color calibration.

16. The color calibration method of claim 14, wherein the UI screen comprises at least one of an automatic setting menu to automatically set the target value, a standard display device setting menu to select a standard image to set the target value among a plurality of the second photographed images of the display device, a reference setting menu to set a pixel value of a stored reference image as the target value, a color temperature setting menu to set the target value through color temperature adjustment, and a manual setting menu to set the target value through adjusting R, G, and B values.

17. A non-transitory computer-readable medium comprising a program stored therein which, when executed, causes a computer to perform a color calibration method comprising:
   obtaining a first photographed image which is generated by photographing a first mono-color test image displayed on a display device;
   detecting an ambient light area on which an ambient light is shining within the first photographed image based on pixel values of the first photographed image, and determining a remaining area of the first photographed image other than the ambient light area as a representative value calculating area;
   obtaining a second photographed image which is generated by photographing a second mono-color test image displayed on the display device;
   calculating a representative value based on pixel values of an area corresponding to the representative value calculating area within the second photographed image; and
   performing color calibration of the display device based on the representative value.

18. A color calibration apparatus, comprising:
   an image obtaining unit configured to obtain an image display by a display device, the display device comprising a plurality of displays which display respective sub-images forming the image, the respective sub-images each having a plurality of pixel values;

a controller configured to, for each of the plurality of displays, exclude a portion of the pixel values and calculate a value with respect to remaining pixel values other than the excluded pixel values; and an image processor configured to, for each of the plurality of displays, perform color calibration according to the calculated value.

19. The color calibration apparatus according to claim 18, wherein the portion of the pixel values excluded by the controller comprises pixel values which are greater than a threshold value.

20. The color calibration apparatus according to claim 19, wherein, for each of the plurality of displays, the image processor performs the color calibration by comparing the representative value to a target value to thereby generate a comparison result and selectively adjusting a gain of the pixel values according to the comparison result.

* * * * *